United States Patent [19]

Dupin et al.

[11] 4,344,928

[45] Aug. 17, 1982

[54] PROCESS FOR PREPARING ALUMINA PARTICULATES, AT LEAST A FRACTION OF WHICH BEING ULTRAFINE BOEHMITE

[75] Inventors: Thierry Dupin, Garges les Gonesse; Gilbert Bouge; Laurent Seigneurin, both of Salindres, all of France

[73] Assignee: Rhone-Poulenc Industries, Paris, France

[21] Appl. No.: 124,777

[22] Filed: Feb. 26, 1980

[30] Foreign Application Priority Data

Feb. 26, 1979 [FR] France ............................ 79 04809

[51] Int. Cl.³ ............................................ C01F 7/02
[52] U.S. Cl. .................................... 423/626; 423/625; 423/631; 423/630
[58] Field of Search ............... 423/625, 631, 628, 626

[56] References Cited

U.S. PATENT DOCUMENTS

| | | | |
|---|---|---|---|
| 1,953,201 | 4/1934 | Tosterud | 423/625 |
| 2,915,475 | 12/1959 | Bugosh | 423/625 |
| 3,031,418 | 4/1962 | Bugosh | 423/625 |
| 3,222,129 | 12/1965 | Osment et al. | 423/625 |
| 3,226,191 | 12/1965 | Osment et al. | 423/628 |
| 3,268,295 | 8/1966 | Armbrust et al. | 423/625 |
| 3,408,160 | 10/1968 | Schmidt et al. | 423/625 |
| 3,608,060 | 9/1971 | Williams et al. | 423/628 |
| 3,628,914 | 12/1971 | Graulier | 423/628 |
| 3,714,343 | 1/1973 | Sato et al. | 423/631 |
| 3,874,889 | 4/1975 | Geppert et al. | 423/625 |
| 3,919,117 | 11/1975 | Michalko | 423/625 |
| 3,928,236 | 12/1975 | Rigge et al. | 423/631 |
| 4,001,144 | 1/1977 | Pearson et al. | 423/631 |
| 4,117,105 | 9/1978 | Hertzenberg et al. | 423/625 |
| 4,120,942 | 10/1978 | Spitzer et al. | 423/631 |
| 4,124,699 | 11/1978 | Michel et al. | 423/625 |
| 4,186,178 | 1/1980 | Oherlandrer | 423/625 |
| 4,191,737 | 3/1980 | Ilwine | 423/625 |

FOREIGN PATENT DOCUMENTS

| | | | |
|---|---|---|---|
| 752295 | 2/1967 | Canada | 423/628 |
| 1246697 | 8/1967 | Fed. Rep. of Germany | 423/625 |

*Primary Examiner*—Herbert T. Carter
*Attorney, Agent, or Firm*—Burns, Doane, Swecker & Mathis

[57] ABSTRACT

Aqueous suspensions of alumina particulates, at least a portion of which comprising ultrafine boehmite, are prepared by maintaining a pH<9 aqueous formulation of poorly crystallized and/or amorphous activated alumina powder for such period of time as to effect the at least partial transformation of such alumina powder into ultrafine boehmite.

32 Claims, 5 Drawing Figures

PROCESS FOR PREPARING ALUMINA PARTICULATES, AT LEAST A FRACTION OF WHICH BEING ULTRAFINE BOEHMITE

BACKGROUND OF THE INVENTION

1. Field of the Invention

The present invention relates to the preparation of alumina, at least a portion of which comprising ultrafine boehmite, and to a variety of useful final products comprised thereof.

2. Description of the Prior Art

It is known to this art, from French Pat. No. 1,261,182, to prepare ultrafine boehmite from aqueous dispersions of alumina by heating same in the presence of a strong, monobasic acid. One of the principal disadvantages of this process consists of the fact that it is necessary to utilize as the source of alumina products such as aluminum chloride, or nitrate solutions obtained from metallic aluminum, which are difficult and expensive to produce.

And in French Pat. No. 1,381,282 there is described a process for the preparation of ultrafine alumina which consists of treating, at a temperature of between 60° and 150° C., a suspension or a cake of amorphous, hydrated alumina gel obtained generally by the continuous precipitation of a solution of sodium aluminate in nitric acid. This process requires the employment, as starting material, of a cake of alumina gel which is rather delicate to prepare, requiring numerous stages therefor (precipitation, filtration, washing, drying, etc.).

SUMMARY OF THE INVENTION

Accordingly, a major object of the present invention is to provide for the preparation of alumina, at least a portion of which comprising ultrafine boehmite, which preparation is devoid of those disadvantages and drawbacks noted above and which proceeds economically, beginning with a starting material that is both inexpensive and readily available.

Briefly, the present invention features the transformation, in aqueous medium having a pH of less than 9, of poorly crystallized and/or amorphous activated alumina powder, into an aqueous suspension of alumina, at least a portion of which comprising ultrafine boehmite. As utilized herein and in the claims which follow, "poorly crystallized" alumina is intended to connote an alumina which, by X-ray analysis, provides a spectrum having but one or few diffuse peaks corresponding to the crystalline phases of low temperature transition alumina, i.e., essentially of the phases chi, rho, eta, gamma. Alumina having an amorphous structure is herein defined as any alumina which, by X-ray analysis, provides a spectrum having no peaks characteristic of any crystalline phases.

DETAILED DESCRIPTION OF THE INVENTION

Figure 1:
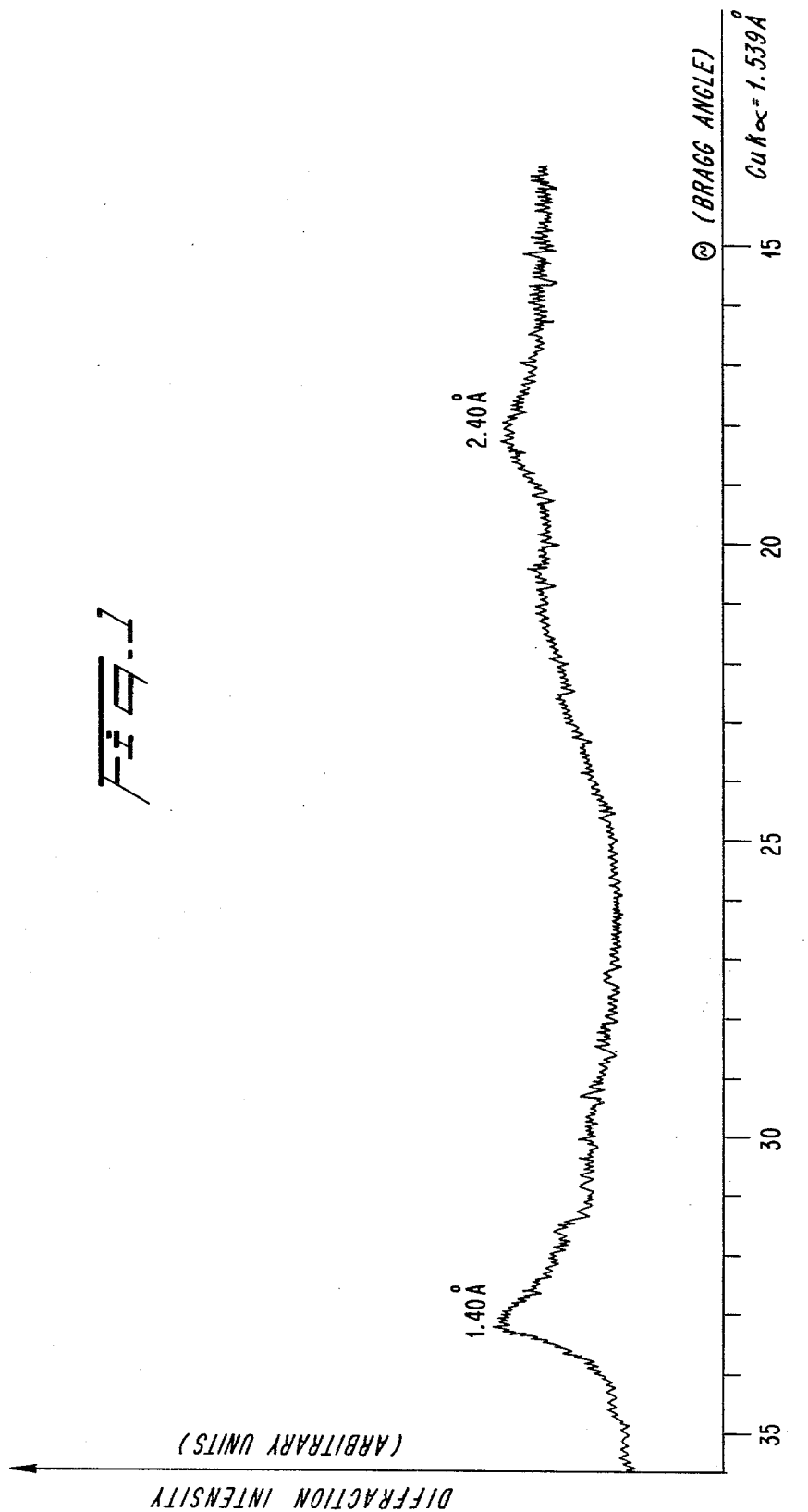
FIG. 1 is an X-ray diffraction spectrum of a starting material alumina according to the invention.

The activated alumina employed according to the invention is conveniently obtained by the rapid dehydration of aluminum hydroxides, such as bayerite, hydrargillite or gibbsite, nordstrandite or hydrous aluminum oxides such as boehmite or diaspore. The dehydration may be effected in any suitable apparatus, advantageously by means of a stream of hot gases. The inlet temperature of the gases in the apparatus advantageously varies from about 400° to 1200° C., and the contact time of the hydroxide or hydrous oxide with the hot gases is typically between a fraction of a second and 4–5 seconds.

The specific surface, measured by the B.E.T. method, of the activated alumina obtained by the rapid dehydration of the aluminum hydroxides or hydrous aluminum oxides typically varies between about 200 and 400 m$^2$/g; the diameter of the particles is typically between 0.1 and 300 microns and, preferably, between 1 and 120 microns; and the ignition loss of such an alumina measured by calcination at 1000° C. typically varies between about 3 and 15%, which corresponds to a molar ratio of $H_2O/Al_2O_3$ of between 0.17 and 0.85.

In a preferred embodiment of the invention, the starting material activated alumina is prepared by rapid dehydration of hydrargillite, a commercial aluminum hydroxide which is readily available and very inexpensive. Such an activated alumina is well known to those skilled in the art; its preparation is specifically described in French Pat. No. 1,108,011.

The activated alumina employed may be used as is, or it may be treated such that its sodium content expressed in $Na_2O$ is less than 1000 ppm.

The activated alumina employed may be either ground or unground. It is of times advantageous to use an activated alumina consisting of particles having diameters between about 1 to 20$\mu$.

According to the invention, the poorly crystallized and/or amorphous activated alumina powder is treated, or transformed, in an aqueous medium, at a pH of less than 9.

The transformation takes place either in vapor in liquid phase. Preferably, it is effected under agitation, in liquid phase.

The aqueous medium utilized may consist of water and/or of aqueous solutions of acids and/or salts which dissociate in water, while releasing an anion to yield a solution having a pH of less than 9; the anion is preferably monovalent.

The acids are water soluble and may either be strong acids or weak acids. Additionally, same may either be mineral acids or organic acids. Among the organic acids, the water soluble monocarboxylic, dicarboxylic and halogenated derivatives thereof, are all well suited for carrying out the process according to the invention. Specifically, the following are representative: nitric acid, perchloric acid, sulfuric acid, hydrochloric acid, idoic acid, hydrobromic acid, formic acid, acetic acid, propanoic acid, butanoic acid, oxalic acid, maleic acid, succinic acid, glutaric acid, and chloro- and bromoacetic acids.

Representative salts are the nitrates, chlorides, formates, acetates, oxalates and carbonates, and advantageously the ammonium, sodium and aluminum nitrates, ammonium acetate, ammonium chloride, ammonium formate, ammonium carbonate.

The acids and/or the salts may be employed either alone or in any admixture thereof.

The concentration of alumina in the aqueous medium, expressed in $Al_2O_3$, is less than approximately 50% by weight, and preferably is between 2 and 20% by weight.

The ratio of the molar concentration of anion to the alumina may vary over wide limits, but a ratio of less than 6 is generally applicable; however, a ratio of less than 3 is preferred.

The temperature of transformation is higher than approximately 80° C. and is preferably higher than 100° C.; more preferably it is between 120° and 225° C. and, most preferably, between 130° and 180° C. The transformation is preferably conducted under reflux or in an autoclave to prevent the loss of reagents of water. Under these conditions, the operating pressure is higher than atmospheric and, preferably, is between 1 and 25 bars; more preferably it is between 2.5 bars and 10 bars.

The reaction time must be sufficient for the at least partial transformation into ultrafine boehmite under the operating conditions for the transformation medium, of temperature, etc. Such time typically varies between approximately 30 minutes and 70 hours and, more characteristically, between 1 and 24 hours. It should be noted that the reaction time may be shortened as the temperature is increased. The temperature and the reaction time specifically affect the proportion of ultrafine boehmite ultimately obtained.

According to the process of the invention, an aqueous suspension of alumina, at least a portion of which comprising ultrafine boehmite, results. Preferably from 5% to 100% of activated alumina powder is converted into the ultrafine boehmite; more preferably from 40% to 100% and furthermore from 60% to 100%.

The crystalline fraction of this alumina is confirmed, by X-ray diffraction (hereinafter, the crystallographic reference axes being those given by B. C. Lipens, Thesis, Delft Technical University, 1961) and by high resolution electron microscopy, as being ultrafine boehmite.

Consistent with the various parameters of the process according to the invention, the resultant ultrafine boehmite consists of single crystals, the dominant morphologies thereof, as detected by Debye-Scherrer diagrams of fibrillar ultrafine boehmites, according to microdensitometer determinations on (002), reflect that the product is a boehmite consisting of single crystals developed essentially in a single crystallographic direction, with the geometry thereof evolving from long and narrow ribbons [reflections (020) and (125) highly attenuated, (105) normally intense] to long and very narrow ribbons [reflections (hkl) absent, halo at (012) and clear (200) reflection]. The direction of elongation of the single crystals is that of imaginary, polymeric double chains for well crystallized boehmite, corresponding to the a axis. In this direction, the single crystals have dimensions between approximately 500 and 5000 Å (estimated by the results of the B.E.T. method).

The electron microdiffraction diagram of fibrillar ultrafine boehmites is characteristic of a product that is frequently oriented by the joining of the fibrils into bundles (or fibers).

The ultrafine fibrillar boehmites dried at 110° C. have specific surfaces between approximately 50 and 600 $m^2/g$ (measured by the B.E.T. method).

The Debye-Scherrer diagram of lamellar ultrafine boehmites displays numerous reflections characteristic of tabular faces also displaying the (002) cleavage corresponding to the oxydril planes of boehmite well crystallized in the form of:

[i] rhombic platelets [(002) and (105) reflections partially extinct, (008) totally extinct],

[ii] elongated rhombic, probably in the (110) direction [(020) doublet, (105) unresolved, (002) and (008) reflections of normal intensity], and

[iii] long and broadened ribbons [(002) reflections partially extinct, (008) and (105) completely extinct].

Further, the application of the Warren method to the ultrafine lamellar boehmites evidences that the crystals exhibit at least two directions of growth, between approximately 100 and 5000 Å, with the thickness of the crystals consituting the third dimension, typically smaller and approximately between 20 and 100 Å.

The ultrafine lamellar boehmites dried at 110° C. have specific surfaces between approximately 50 and 300 $m^2/g$ (measured by the B.E.T. method).

Without limiting the present invention to this theory, it is suspected that the shape of the ultrafine boehmite single crystals obtained may be specifically affected by the amount of anions adsorbed on the different crystalline planes and by the temperature of transformation.

Thus, in a general manner, it is conceivable that at a constant temperature, when the pH of the medium decreases and the ratio of molar concentrations of the anion to the alumina increases, the form of the ultrafine boehmite single crystals obtained evolves into lamellar forms from the fibrillar forms described hereinabove.

For example, in the particular case of treatment in a nitrate medium at a pH less than 1.4 and a ratio of the molar concentration of the anion to that of alumina greater than 0.3, the form of the boehmites is entirely fibrillar, the single crystals being essentially in the form of long and narrow ribbons; in the event of a transformation pH of 7 (water) and a molar concentration of anion to alumina in a ratio equalling zero, the form of the resultant boehmite is entirely lamellar, with the single crystals being essentially in the form of rhombic platelets.

It is further reasoned, that with the pH and the ratio of the molar concentrations of the anion to the alumina constant, rising temperatures will induce crystal growth in different crystallographic directions. More particularly, in the case of the ultrafine, lamellar boehmites, the thickness of the single crystals increases when the temperature is increased, while growth in the other two directions increases less appreciably. For the ultrafine fibrillar boehmites, the increase in dimension of the single crystals in the direction of a axis is appreciable with rising temperatures, while in the other two crystallographic directions, with rising temperatures very narrow, long ribbons develop from the long and narrow ribbons, followed by the development of lamellar boehmites from long and broadening ribbons.

The alumina-based products obtained by drying the suspension obtained according to the invention have a specific surface between approximately 50 and 600 $m^2/g$. Drying may be effected by any means, e.g., in an oven, in a fluidized bed dryer, or via an atomizer. In the case of products consisting of alumina, at least a fraction of which comprising ultrafine fibrillar boehmite, drying may be effected in a manner well known to those skilled in the art, by means of azeotropic distillation after dispersion of same in an organic medium.

Analysis of the product obtained after drying the suspension and calcining same at 600° C. evidences the presence of transition alumina having a gamma structure, characteristic of the boehmitic relationship.

The material obtained after drying and calcination at a temperature of between 500° and 1100° C. specifically contains at least one of the alumina phases included in the group comprising gamma, delta, theta.

The material obtained after drying and calcination at a temperature in excess of 1100° C., in particular, comprises alpha alumina.

The uses or applications for the suspensions obtained according to the process of the invention, including the material resulting after drying and also that resulting after calcination, are those typically characteristic of the known aluminas comprising ultrafine boehmite. For example, uses as fillers, binders, expansion agents, dispersants, film forming agents, reinforcements, membranes, base materials for catalyst supports, etc. are representative.

In order to further illustrate the present invention and the advantages thereof, the following specific examples are given, it being understood that same are intended only as illustrative and in nowise limitative.

EXAMPLE 1:

An activated alumina resulting from the rapid dehydration of hydrargillite in a fluid bed reactor by means of a stream of hot gas, (fuel-oil combustion), having an inlet temperature of approximately 800° C. and with employment of a contact time of approximately ½ second, was utilized as the alumina starting material. Such alumina had a specific surface of 300 m²/g, an ignition loss of 4%; the X-ray diffraction spectrum illustrated in FIG. 1 indicates that same is a poorly crystallized alumina exhibiting, in particular, diffuse rays at about 2.40 Å and 1.40 Å, which is common to gamma, eta, chi transition alumina. The dimensions of the particles were such that 70% had a diameter of less than 17 microns.

Fifty g of the aforesaid alumina were introduced into an autoclave containing 1 liter of distilled water, having a pH of 7 (in this example, the amount of anions introduced was zero). The autoclave was agitated. Same was heated for 5 hours at 135° C.

Figure 2:
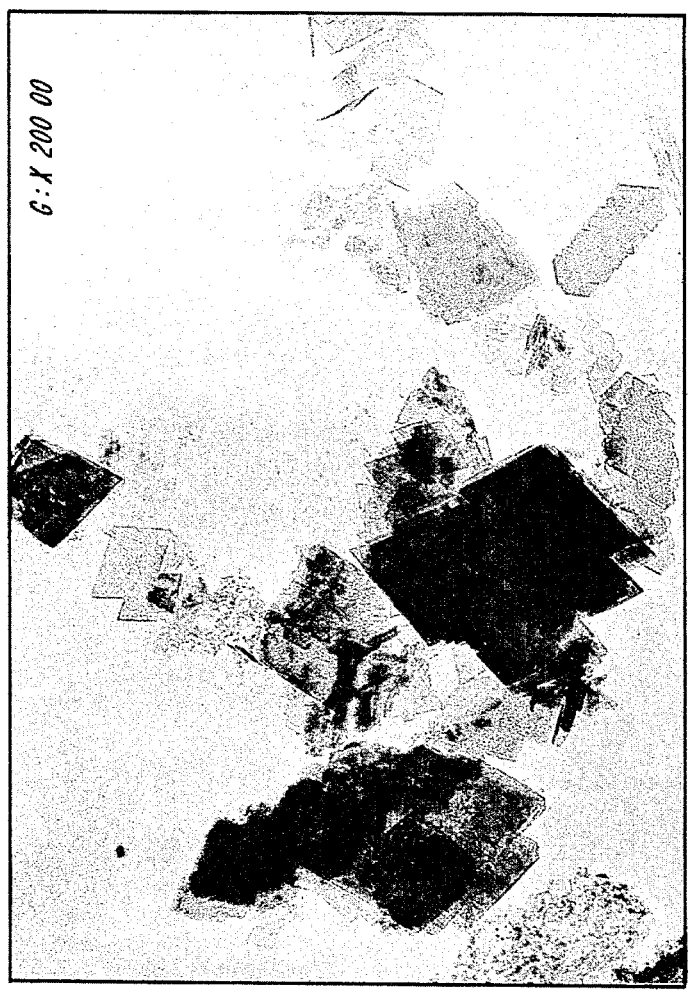
FIG. 2 is an electron photomicrograph of an alumina suspension prepared according to the invention.

A suspension of alumina containing ultrafine boehmite entirely in the lamellar form was obtained, exhibiting a degree of transformation of approximately 35%. Examination of the resultant suspension by transmission electron microscopy (FIG. 2) evidenced that the crystalline fraction consisted of ultrafine boehmite entirely in lamellar form and characterized by rhombic platelets having a thickness of approximately 50 Å and dimensions in the two other directions of between about 800 and 2500 Å.

The specific surface of the resultant product, after drying of the suspension in an oven at 110° for 3 hours, was approximately 270 m²/g.

After calcination at 600° C. of the dried product, the thus obtained alumina had the morphology of tetragonal gamma alumina and its specific surface was approximately 240 m²/g.

EXAMPLE 2:

Fifty g of the activated alumina prepared as in Example 1 were introduced into an autoclave containing an aqueous solution of ammonium nitrate, having a pH of 5.4, and with the molar ratio $NO_3/Al_2O_3$ being equal to 0.3. The autoclave was agitated. Same was heated for 24 hours at 150° C.

An alumina suspension containing ultrafine boehmite entirely in the lamellar form, exhibiting a degree of transformation of approximately 70%, was obtained.

Figure 3:
FIG. 3 is an electron photomicrograph of another alumina suspension prepared according to the invention.

Transmission electron microscopy of the resultant suspension (FIG. 3) evidenced that the crystalline fraction consisted of ultrafine boehmite entirely in the lamellar form and characterized by rhombic platelets having a thickness of approximately 50 Å and dimensions in the other two directions of between about 1500 and 2000 Å.

The specific surface of the product obtained, after drying of the suspension in an oven at 110° C. for 3 hours, was approximately 160 m²/g.

After calcination at 600° C. of the dried product, the thus obtained alumina comprised tetragonal gamma alumina and its specific surface was approximately 140 m²/g.

EXAMPLE 3:

Fifty g of the activated alumina prepared as in Example 1 were introduced into an autoclave containing 1 liter of an equimolar mixture of nitric acid and ammonium nitrate, having a pH of 1.38, and with the molar ratio of $NO_3/Al_2O_3$ being equal to 0.3. The autoclave was agitated. Same was heated for 24 hours at 150° C.

An alumina suspension containing ultrafine boehmite entirely in the lamellar form, exhibiting a degree of transformation of approximately 60%, was obtained.

Figure 4:
FIG. 4 is an electron photomicrograph of yet another alumina suspension prepared according to the invention.

Transmission electron microscopic examination of the resultant suspension (FIG. 4) evidenced that the crystalline fraction consisted of ultrafine boehmite entirely in the lamellar form characterized by long and extended "ribbons" having a thickness of approximately 40 Å, a length varying between 2000 and 3000 Å and a width varying between 150 and 200 A. At the top of the photomicrograph, a residue comprising the starting material can be seen.

The specific surface of the product obtained, after drying the suspension in an oven at 110° C. for 3 hours, was approximately 200 m²/g.

After calcination at 600° C. of the dried product, the thus obtained alumina comprised tetragonal gamma alumina having a specific surface of approximately 175 m²/g.

EXAMPLE 4:

Fifty g of activated alumina prepared as in Example 1 were introduced into an autoclave containing 1 liter of an aqueous solution of nitric acid, having a pH of 0.85, and with the molar ratio of $NO_3/Al_2O_3$ being equal to 0.3. The autoclave was agitated; same was heated for 29 hours at 130° C.

An alumina suspension containing ultrafine boehmite entirely in the fibrillar form was obtained, exhibiting a degree of transformation of approximately 40%.

Figure 5:
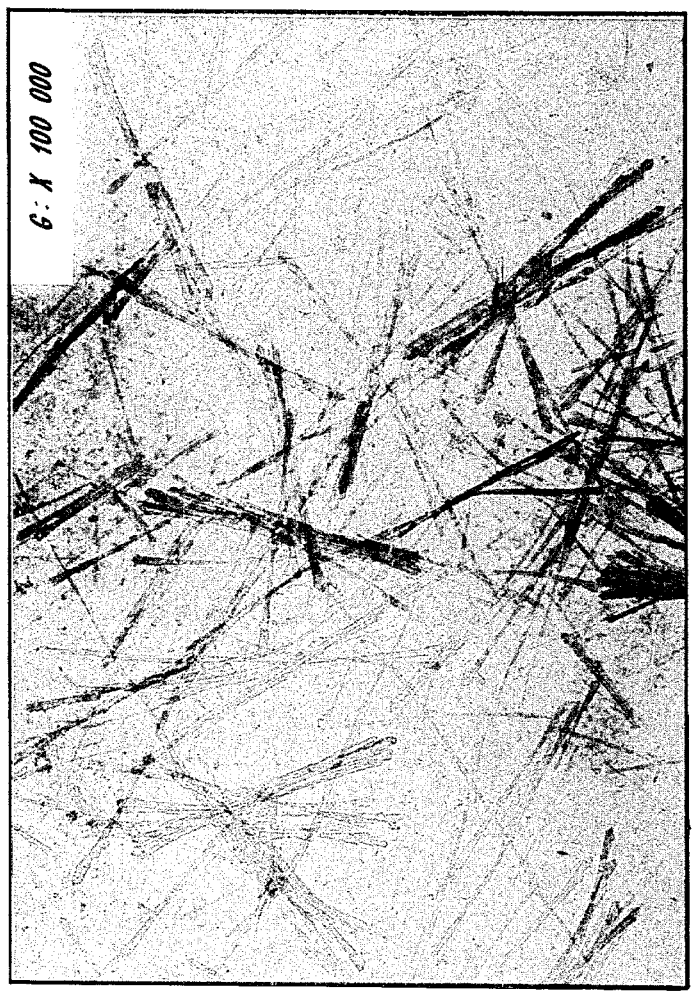
FIG. 5 is an electron photomicrograph of still another alumina suspension prepared according to the invention.

Transmission electron microscopic examination of this suspension (FIG. 5) evidenced that the crystalline fraction consisted entirely of ultrafine boehmite in the fibrillar form, characterized by long and narrow ribbons, having a length of approximately 2000 to 3000 Å and dimensions in the other two directions of between approximately 20 and 50 Å.

The specific surface of the product obtained, after drying the suspension in an oven at 110° C. for 3 hours, was approximately 300 m²/g.

After calcination at 600° C. of the dried product, the thus obtained alumina comprised gamma alumina having a specific surface of approximately 250 m²/g.

EXAMPLE 5:

An activated alumina powder prepared as in Example 1 was utilized and same was treated in an autoclave under varying conditions in differing media, according to the general technique described in the foregoing Examples 1 to 4.

The varying conditions and the various results obtained are reported in the Table I which follows:

TABLE I

| Experiment No. | Medium | Autoclave conditions | | | | | Degree of transformation, in % | Characteristics of resultant product | | | Specific surface after drying at 150° C., in m²/g |
| | | pH | Alumina concentration, in % | Anion concentration/alumina concentration | Temperature, in °C. | Time in hrs | | Crystallites | | | |
| | | | | | | | | Width, in Å | Length, in Å | Thickness, in Å | |
|---|---|---|---|---|---|---|---|---|---|---|---|
| 1 | HNO₃ | 0.87 | 5 | 0.3 | 130 | 2 | 12 | 50–75 | 800–1200 | 30 | 306 |
| 2 | HNO₃ | 0.87 | 5 | 0.3 | 130 | 29 | 37 | 50–75 | 2000–3000 | 40 | 304 |
| 3 | HNO₃ | 0.86 | 5 | 0.3 | 150 | 2 | 23 | 50–75 | 1500–2000 | 40 | 315 |
| 4 | HNO₃ | 0.86 | 5 | 0.3 | 150 | 29 | 75 | 100–150 | 2000–3000 | 60 | 182 |
| 5 | HNO₃ | 0.82 | 5 | 0.5 | 170 | 0.5 | 29 | 50–75 | 1800–2000 | 30 | 296 |
| 6 | HNO₃ | 0.82 | 5 | 0.5 | 170 | 2 | 44 | 75–100 | 1500–2500 | 50 | 253 |
| 7 | HNO₃ | 0.82 | 5 | 0.5 | 170 | 6 | 75 | 100–150 | 2000–3000 | 60 | 191 |
| 8 | HNO₃—Al(NO₃)₃ | 0.84 | 5 | 0.4 | 150 | 21 | 65 | 100–150 | 1500–3000 | 50 | 229 |
| 9 | HNO₃—Al(NO₃)₃ | 0.82 | 5 | 0.6 | 150 | 21 | 70 | 100–150 | 2000–3000 | 60 | 190 |
| 10 | HNO₃ | 1.48 | 5 | 0.15 | 150 | 21 | 72 | 200–500 | 2000–3000 | 60 | 198 |
| 11 | HNO₃ | 0.73 | 5 | 0.5 | 150 | 21 | 67 | 50–100 | 2000–3000 | 60 | 203 |
| 12 | HNO₃ | 0.29 | 5 | 1 | 150 | 21 | 59 | 50–100 | 2000–3000 | 50 | 233 |
| 13 | HNO₃—NH₄NO₃ | 1.38 | 5 | 0.3 | 150 | 21 | 63 | 200–400 | 2000–3000 | 70 | 192 |
| 14 | HNO₃—NH₄NO₃ | 1.55 | 5 | 0.3 | 150 | 21 | 54 | 600–800 | 1500–2000 | 80 | 213 |
| 15 | HNO₃—NH₄NO₃ | 1.66 | 5 | 0.3 | 150 | 2 | 51 | 800–1500 | 1500–2000 | 80 | 216 |
| 16 | HNO₃ | 1.26 | 2 | 0.3 | 150 | 21 | 70 | 150–300 | 2000–3000 | 60 | 206 |
| 17 | HNO₃ | 0.59 | 10 | 0.3 | 150 | 21 | 70 | 50–100 | 2000–3000 | 60 | 214 |
| 18 | HNO₃ | 0.87 | 2 | 0.3 | 150 | 21 | 60 | 50–100 | 2000–3000 | 60 | 210 |
| 19 | CH₃COOH | 3.02 | 5 | 0.08 | 150 | 21 | 68 | 800–1500 | 1500–2500 | 110 | 173 |
| 20 | CH₃COOH | 2.95 | 5 | 0.15 | 150 | 21 | 65 | 800–1500 | 1500–2500 | 90 | 198 |
| 21 | CH₃COOH | 2.90 | 5 | 0.3 | 150 | 21 | 57 | 600–1000 | 2000–3000 | 70 | 203 |
| 22 | CH₃COOH | 2.77 | 5 | 1 | 150 | 21 | 71 | 300–400 | 2000–2500 | 70 | 180 |
| 23 | HNO₃—CH₃COOH | 1.76 | 5 | 0.04 +0.17 | 150 | 21 | 58 | 800–1200 | 2000–4000 | 60 | 218 |
| 24 | HNO₃—CH₃COOH | 1.38 | 5 | 1.1 +0.17 | 150 | 21 | 61 | 100–300 | 1500–3000 | 60 | 195 |
| 25 | (COOH)₂ | 1.14 | 5 | 0.05 | 150 | 21 | 23 | 100–300 | 1000–5000 | 50 | 268 |
| 26 | CH₃COONH₄ | 7.1 | 5 | 0.08 | 140 | 4 | 50 | 1200–1500 | 1500–2000 | 150 | 195 |
| 27 | NH₄HCO₃ | 8.9 | 5 | 0.1 | 150 | 21 | 80 | 600–900 | 1000–1500 | 120 | 155 |
| 28 | CH₃COOH | 2.36 | 5 | 2 | 150 | 21 | 100 | 150–200 | 2500–3500 | 90 | 144 |
| 29 | CH₃COOH | 2.26 | 5 | 3 | 150 | 21 | 98 | 100–150 | 2500–3500 | 70 | 165 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an aqueous suspension of alumina particulates, at least a portion of which comprises ultrafine boehmite, which process comprises maintaining an aqueous formulation comprising water and an alumina powder having a specific surface between about 200 and 400 m$^2$/g, particle diameters between about 0.1 and 300 microns, ignition loss, measured by calcination at 1000° C., of between about 3 and 15%, and which is selected from the group consisting of poorly crystalline activated alumina, amorphous activated alumina, and admixtures thereof, said aqueous formulation having a pH of less than 9, at a temperature in the range of from about 120° to about 225° C. for a period of time sufficient to effect the transformation of at least 5% of such alumina powder into ultrafine boehmite.

2. The process as defined by claim 1, wherein the particle diameters of the starting material alumina powder are between 1 and 120 microns.

3. The process as defined by claim 2, wherein the particle diameters of the starting material alumina powder are between 1 and 20 microns.

4. A process for the preparation of an aqueous suspension of alumina particulates, at least a portion of which comprises ultrafine boehmite, which process comprises maintaining an aqueous formulation comprising water and an alumina powder which is the product of dehydration by means of a stream of hot gas at a temperature of between 400° and 1200° C. for a period of time of between about a fraction of a second to 4-5 seconds and is selected from the group consisting of poorly crystalline activated alumina, amorphous activated alumina, and admixtures thereof, said aqueous formulation have a pH of less than 9, at a temperature in the range of from about 120° C. to about 225° C. for a period of time sufficient to effect the transformation of at least 5% of such alumina powder into ultrafine boehmite.

5. The process as defined by claim 1 or 4, wherein the alumina powder starting material has a sodium content, expressed as Na$_2$O, of less than 1000 ppm.

6. The process as defined by claim 1 or 4, wherein the aqueous formulation is maintained in vapor phase.

7. The process as defined by claim 1 or 4, wherein the aqueous formulation is maintained in liquid phase and under agitation.

8. The process as defined by claim 1 or 4, wherein the aqueous formulation consists essentially of the starting material alumina powder and of water.

9. The process as defined by claim 1 or 4, wherein the aqueous formulation comprises the starting material alumina powder, water, and an acid which dissociates in water.

10. The process as defined by claim 9, wherein the anion of dissociation is monovalent.

11. The process as defined by claim 9, wherein the acid is selected from the group consisting of hydrochloric acid, nitric acid, perchloric acid, sulfuric acid, iodic acid, hydrobromic acid, formic acid, acetic acid, propanoic acid, butanoic acid, oxalic acid, maleic acid, succinic acid, glutaric acid, chloro- and bromoacetic acids.

12. The process as defined by claim 9, wherein the ratio of the molar concentration of the anion of dissociation to the alumina is less than 6.

13. The process as defined by claim 12, such ratio being less than 3.

14. The process as defined in claim 1 or 4, wherein the aqueous formulation comprises the starting material alumina powder, water, and a salt which dissociates in water.

15. The process as defined by claim 14, wherein the anion of dissociation is monovalent.

16. The process as defined by claim 14, wherein the salt is selected from the group consisting of ammonium, sodium and aluminium nitrates, ammonium chloride, ammonium acetate, ammonium formate and ammonium carbonate.

17. The process as defined by claim 14, wherein the ratio of the molar concentration of the anion of dissociation to the alumina less than 6.

18. The process as defined by claim 17, such ratio being less than 3.

19. The process as defined by claim 1 or 4, wherein the aqueous formulation has a concentration in alumina, expressed in Al$_2$O$_3$, of less than 50% by weight.

20. The process as defined by claim 19, wherein such concentration is between 2 and 20%.

21. The process as defined by claim 1 or 4, the temperature of transformation being between 130° and 180° C.

22. The process as defined by claim 21, the aqueous formulation being maintained under a pressure of from 1 to 25 bars.

23. The process as defined by claim 22, the aqueous formulation being maintained for from 30 minutes to 70 hours.

24. The process as defined by claim 23, the aqueous formulation being maintained for from 1 to 24 hours.

25. The process as defined by claim 23, further comprising drying the resultant suspension of transformation.

26. The process as defined by claim 25, further comprising calcining the dried suspension of transformation at a temperature in excess of 550° C.

27. The process as defined by claim 1 or 4, the aqueous formulation being maintained under reflux.

28. The process as defined by claim 1 or 4, the aqueous formulation being maintained in an autoclave.

29. The process as defined by claim 4, wherein the starting material alumina powder is selected from the group consisting of aluminium hydroxides and hydrous aluminium oxides.

30. The process as defined by claim 29, the alumina powder starting material being the product of dehydration of an aluminum hydroxide selected from the group consisting of bayerite, hydrargillite, gibbsite and nordstrandite.

31. The process as defined by claim 30, said alumina hydroxide dehydrated being hydrargillite.

32. The process as defined by claim 29, the alumina powder starting material being the product of dehydration of a hydrous aluminium oxide selected from the group consisting of boehmite and diaspore.

* * * * *